(12) United States Patent
Nies et al.

(10) Patent No.: US 8,074,450 B2
(45) Date of Patent: Dec. 13, 2011

(54) WIND ENERGY SYSTEM WITH FLUID-WORKING MACHINE WITH NON-SYMMETRIC ACTUATION

(75) Inventors: Jacob Johannes Nies, Zwolle (NL); Jan Erich Hemmelmann, München (DE)

(73) Assignee: General Electric Company, Schenectady, NY (US)

( * ) Notice: Subject to any disclaimer, the term of this patent is extended or adjusted under 35 U.S.C. 154(b) by 638 days.

(21) Appl. No.: 12/190,746

(22) Filed: Aug. 13, 2008

(65) Prior Publication Data

US 2010/0040470 A1    Feb. 18, 2010

(51) Int. Cl.
*F04B 49/06*    (2006.01)
*F04B 53/10*    (2006.01)

(52) U.S. Cl. ............................................. 60/398; 92/72
(58) Field of Classification Search ...................... 60/398, 60/489; 91/491; 92/72
See application file for complete search history.

(56) References Cited

U.S. PATENT DOCUMENTS

| | | | | |
|---|---|---|---|---|
| 4,503,673 A | * | 3/1985 | Schachle et al. | 60/398 |
| 4,598,628 A | * | 7/1986 | Courtright | 60/398 |
| 5,259,738 A | * | 11/1993 | Salter et al. | 417/505 |

FOREIGN PATENT DOCUMENTS

| | | | |
|---|---|---|---|
| EP | 0494236 B1 | | 12/1995 |
| EP | 1537333 B1 | | 6/2006 |
| JP | 2005248738 A | * | 9/2005 |
| WO | WO2004/025122 A1 | | 3/2004 |
| WO | WO2006/090174 A1 | | 8/2006 |
| WO | WO2006/109079 A1 | | 10/2006 |
| WO | WO 2007053036 A1 | * | 5/2007 |

* cited by examiner

*Primary Examiner* — Thomas E Lazo
(74) *Attorney, Agent, or Firm* — Global Patent Operation; Douglas D. Zhang

(57) ABSTRACT

The invention relates to a wind energy system with hydraulic energy transmission with non-symmetric actuation. The non-symmetric actuation is caused by valve control and mechanical means for controlling the actuation of the pistons. A cylinder unit is provided comprising a drive unit and an output unit associated with two hydraulic connections. The drive and the output unit comprise a minimum of two cylinders, in which pistons are reciprocating. Some of the cylinders can be switched off during low wind speeds. The cylinders communicate with a low pressure manifold and a high pressure manifold. These manifolds are part of the hydraulic connections. Use of the fluid-working machine as transmission in wind energy systems increases the overall economical efficiency.

13 Claims, 12 Drawing Sheets

WIND ENERGY SYSTEM WITH FLUID-WORKING MACHINE WITH NON-SYMMETRIC ACTUATION

BACKGROUND OF THE INVENTION

The present invention relates to wind energy systems and fluid working machines. Specifically, the present invention relates to a wind energy system with a fluid working machine acting as a transmission.

Wind energy systems are experiencing an increasing demand. Therefore, large multi-megawatt wind turbines are being installed in many locations throughout the world. They change the kinetic energy of the wind to electrical energy. For large wind energy systems, a transmission box is inevitable in the majority of cases as a result of the high loads that arise from the energy entered from the rotor. However, the construction of the transmission box causes problems as many load changes take place due to the fact that the energy from the wind frequently varies. Therefore, the requirements for the transmission box are numerous and strict.

It is known in the art to use a gearbox as transmission box. In the early phase of wind energy systems, the gearbox was the source of failures and defects in many wind turbines. The reason for these gearbox problems was the difficulty of a correct dimensioning of the gearbox with regard to the load spectrum. Today, the early phase problems have been largely solved, but the construction of the gearboxes is still a difficult task considering size, mass and costs.

BRIEF DESCRIPTION OF THE INVENTION

In view of the above, a wind energy system is provided comprising a fluid-working machine with non-symmetric actuation acting as transmission.

According to another embodiment, a wind energy system is provided comprising a fluid-working machine acting as a transmission with working chambers that can be switched to a predetermined state.

According to another embodiment of the invention, a wind energy system is provided with non-symmetric actuation and with working chambers that can be switched to a predetermined state.

According to another aspect, a method of operating a wind energy system is provided including providing a fluid-working machine with non-symmetric actuation as transmission of the wind energy system.

According to another aspect, a method of operating a wind energy system is provided including providing a fluid-working machine acting as transmission and switching off working chambers of the fluid working machine.

According to another aspect, use of a fluid-working machine with non-symmetric actuation in a wind energy system is provided.

According to another aspect, use of a fluid-working machine having working chambers that can be switched to a predetermined state is provided.

According to another aspect, a wind energy system comprising a fluid-working machine with non-symmetric actuation acting as a transmission is provided, whereby said fluid-working machine receives a rotational energy and outputs the rotational energy to a second device.

Typically, the wind energy system further comprises a rotor with at least one rotor blade and a generator for converting kinetic energy into electric energy. According to typical embodiments, the fluid-working machine is placed between the rotor and the generator. Hence, the fluid-working machine acts as a transmission for forwarding the rotational energy of the rotor to the generator. Typically, the rotational frequency is thereby amended.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Generally, embodiments described herein refer to a fluid-working machine with non-symmetric actuation acting as a transmission. A fluid-working machine allows the hydraulic energy transmission. For fluid working machines, different actuation principles are known, such as radial piston machines actuated by an eccentricity or axial piston machines actuated by a pivoted eccentric disc or camshaft. Thereby a continuously variable transmission of the rotor torque to the generator can be achieved and the size of the apparatus transferring the torque can be decreased in comparison to conventional gears. Hence, the wind energy system production costs will decrease and the overall efficiency in terms of generated energy per invested money increases.

Fluid working machines are designed for optimum efficiency around a certain operation range. The application of fluid working machines in wind energy systems as means of main power transmission requires high efficient operation and low pressure and flow fluctuation at varying rotational speed.

Figure 1:
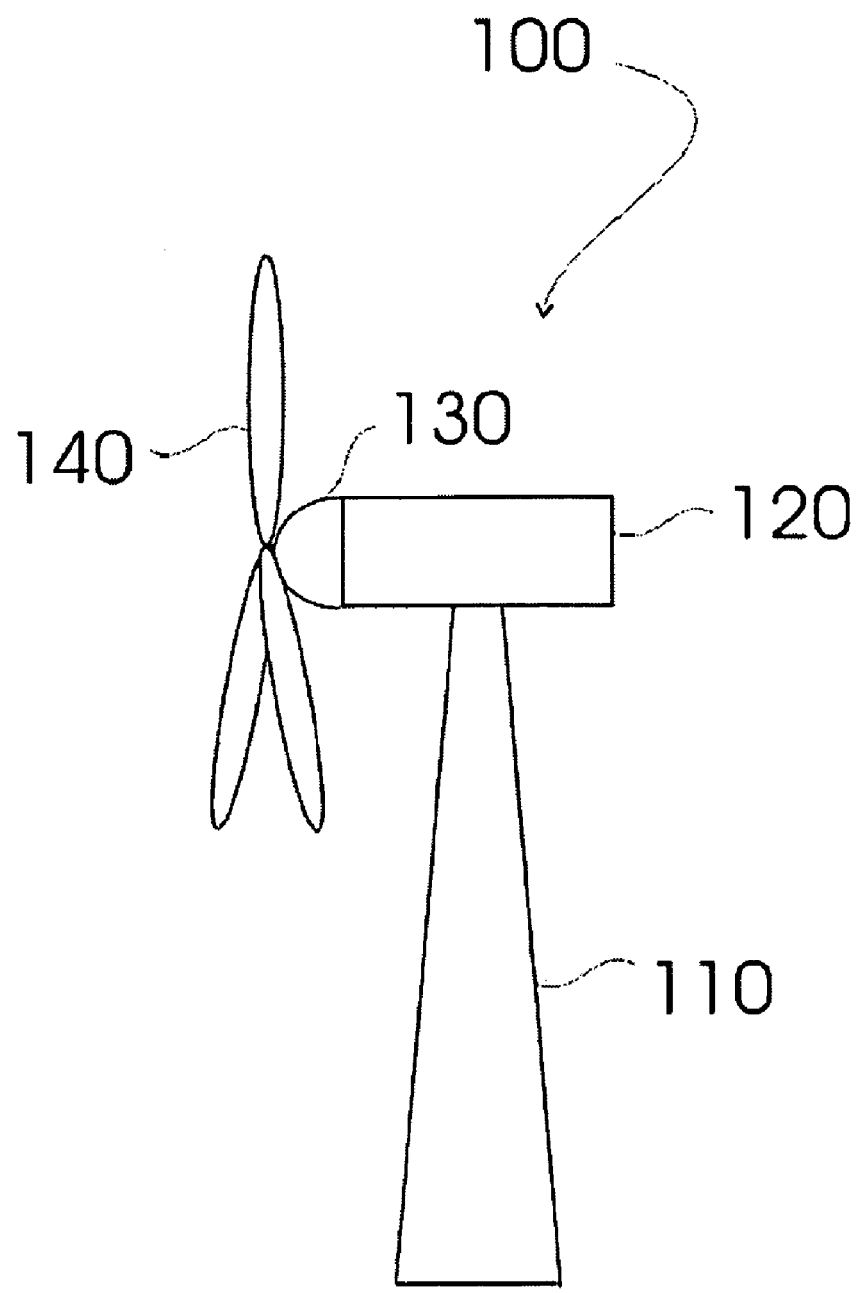
FIG. 1 shows a schematic view of a wind energy system according to embodiments described herein.

FIG. 1 is a schematic side view of a wind energy system, e.g. a wind turbine. The wind energy system 100 has a tower 110 to which the nacelle 120 is mounted at its top end. The nacelle houses a drive train (shown in FIG. 2) to which a generator is connected (shown in FIG. 2). A hub 130 bearing three rotor blades 140 is mounted to a lateral end of the machine nacelle 120.

Figure 2:
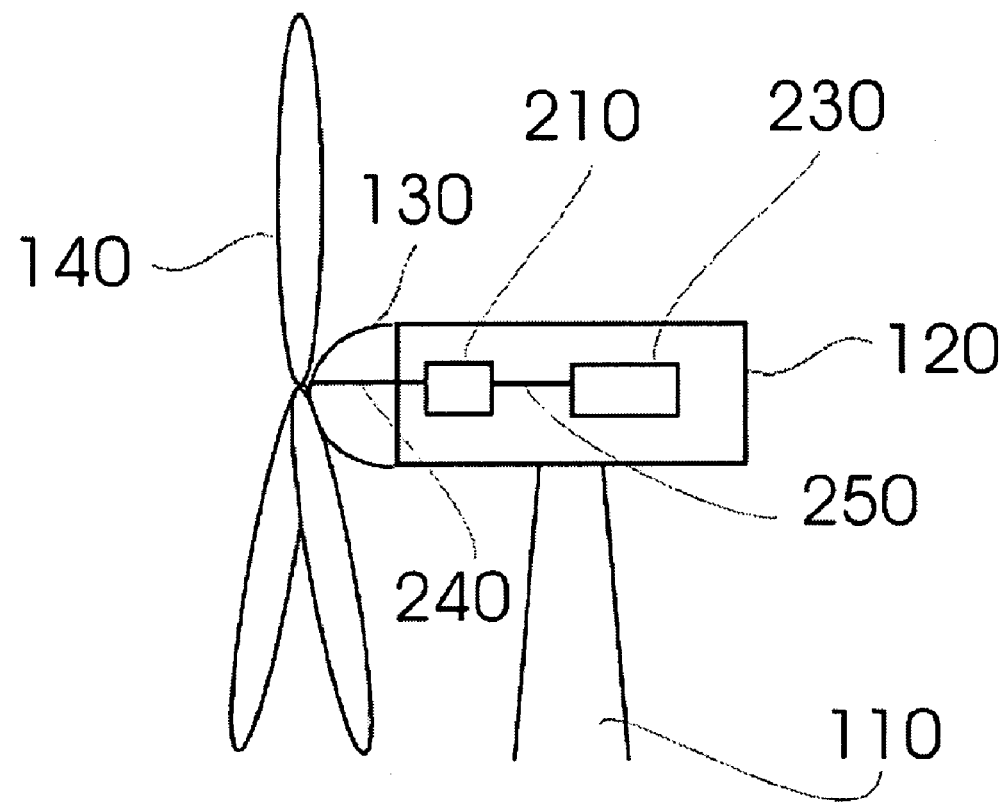
FIG. 2 shows a schematic side view of the top of a wind energy system according to embodiments described herein.

FIG. 2 shows a more detailed view of the top of an embodiment of a wind turbine. The nacelle 120 houses a drive train containing the rotor hub 130, the rotor shaft 240, the transmission box 210 and the generator drive-shaft 250. The output of the transmission box 210 is connected to a main electric generator 230. The transmission box 210 is mounted between rotor hub and generator. Typically, the transmission box is placed on the rear end of the rotor shaft 240. According to embodiments described herein, the transmission box 210 is a fluid-working machine that acts as a transmission.

Figure 3A:
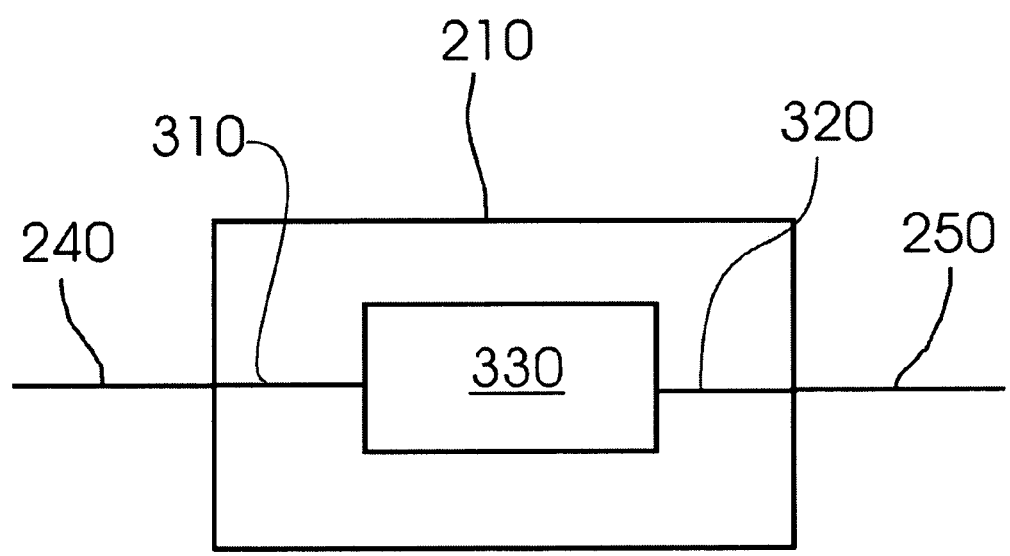
FIG. 3a shows a schematic view of a transmission box with a cylinder unit according to embodiments described herein.

FIG. 3a shows a closer view of an embodiment of the transmission box 210. Generally, as shown in this embodiment, the transmission box 210 is a fluid-working machine. The fluid-working machine typically contains one or more cylinder units 330 and acts as a transmission. The rotor shaft 240 is connected to the cylinder unit 330. According to embodiments described herein, the rotor shaft 240 is connected to or vests in the drive shaft 310 of the cylinder unit. The rotor shaft 240 transmits the energy absorbed by the rotor blades 140 and passes it from the rotor blades 140 to the cylinder unit 330. The rotor shaft may be directly connected to the cylinder draft, or via an intermediate shaft such as the drive shaft 310 shown in FIG. 3a. The rotor shaft transmits the kinetic energy to the fluid working machine which may comprise several cylinder units. The cylinder unit 330 is connected to the generator 230. According to embodiments described herein, an output shaft 320 is connected to the output of the cylinder unit 330 and gives the energy to the generator shaft 250. The generator shaft 250 passes on the energy to the generator 230. The generator changes the kinetic energy into electrical energy.

Figure 3B:
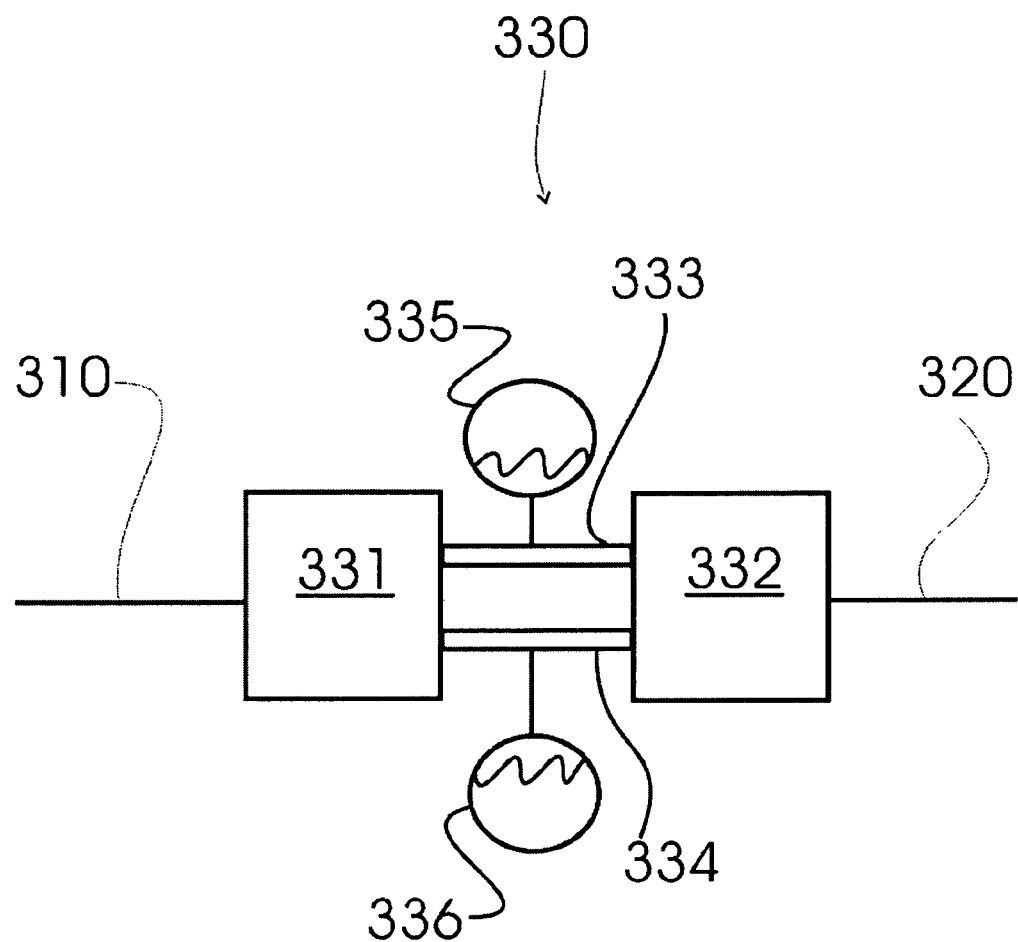
FIG. 3b shows a schematic more detailed view of a cylinder unit according to embodiments described herein.

In FIG. 3b a closer view of an embodiment of the cylinder unit 330 is shown. The cylinder unit 330 contains a drive unit 331, an output unit 332, two hydraulic connections 333 and 334 and two fluid-storages 335 and 336. According to embodiments described herein, the storages can be pressure manifolds, for instance a low pressure manifold 335 and a high pressure manifold 336. The drive shaft is connected to the drive unit 331 of the cylinder unit 330. The output shaft 320 is connected to the output unit 332. The drive unit 331 and the output unit 332 are connected through two hydraulic connections. One of them, hydraulic connection 333 is linked to a storage 335, for instance a low pressure manifold. The other one, hydraulic connection 334 is linked to a storage 336, for instance a high pressure manifold. The hydraulic connection between drive unit 331 and output unit 332 assures the transmission of the energy in a variable transmission ratio.

Figure 3C:
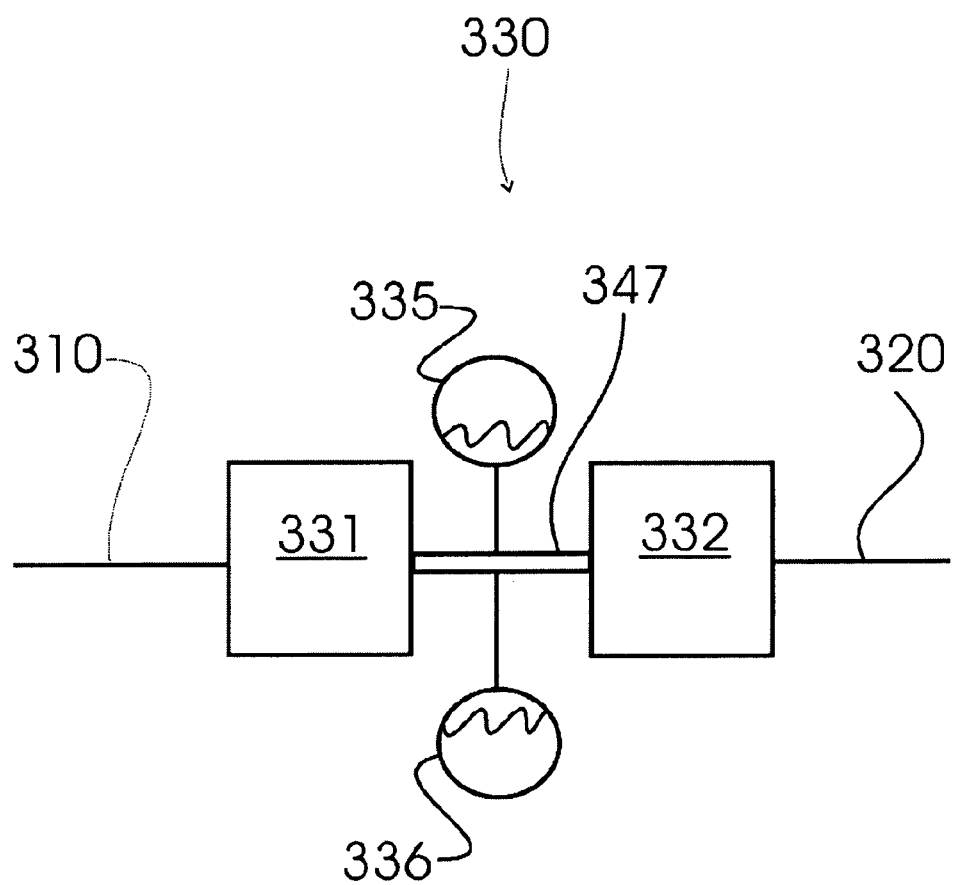
FIG. 3c shows a schematic more detailed view of a cylinder unit according to further embodiments described herein.

Another embodiment is shown in FIG. 3c. In this embodiment, only one hydraulic connection 347 is given between the drive unit 331 and the output unit 332. The content of the hydraulic connection 347 can be selectively valved from the storages 336 and 335. Therefore, the same functionality is provided as explained above with regard to FIG. 3b. According to yet a further embodiment, the hydraulic connection may also be a cylinder.

Figure 3D:
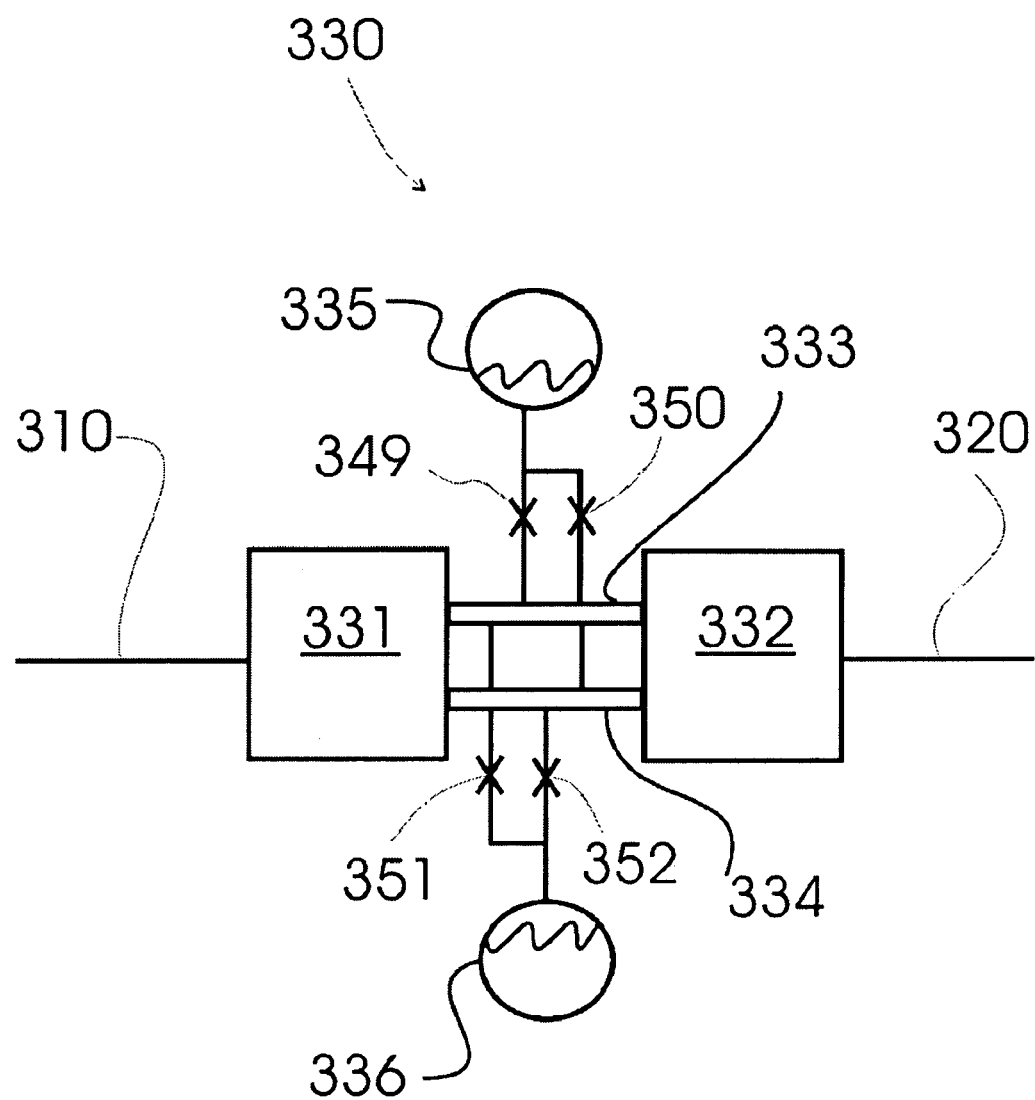
FIG. 3d shows a schematic more detailed view of a cylinder unit according to further embodiments described herein.

Another embodiment is shown in FIG. 3d. The drive unit 331 and the output unit 332 are connected by two hydraulic connections 333 and 334. Two storages 335 and 336, which are for example a low pressure manifold and a high pressure manifold, are also connected to the hydraulic connections 333 and 334. By means of two valves 349 and 350, the storage 335 can be connected to either hydraulic connection 333 or hydraulic connection 334. According to some embodiments, when both valves 349 and 350 are opened, the storage 335 can be connected to both hydraulic connections 333 and 334.

According to embodiments described herein, storage 336 is also connected to both hydraulic connections 333 and 334 by means of valves 351 and 351. By valves 351 and 352, storage 336 can be connected to either hydraulic connection 333 or hydraulic connection 334. According to some embodiments, when both valves 351 and 352 are opened, the storage 336 can be connected to both hydraulic connections 333 and 334. According to some embodiments, the valves 349, 350, 351, and 352 may be controlled by a controller (not shown), for instance a computer.

Figure 4A:
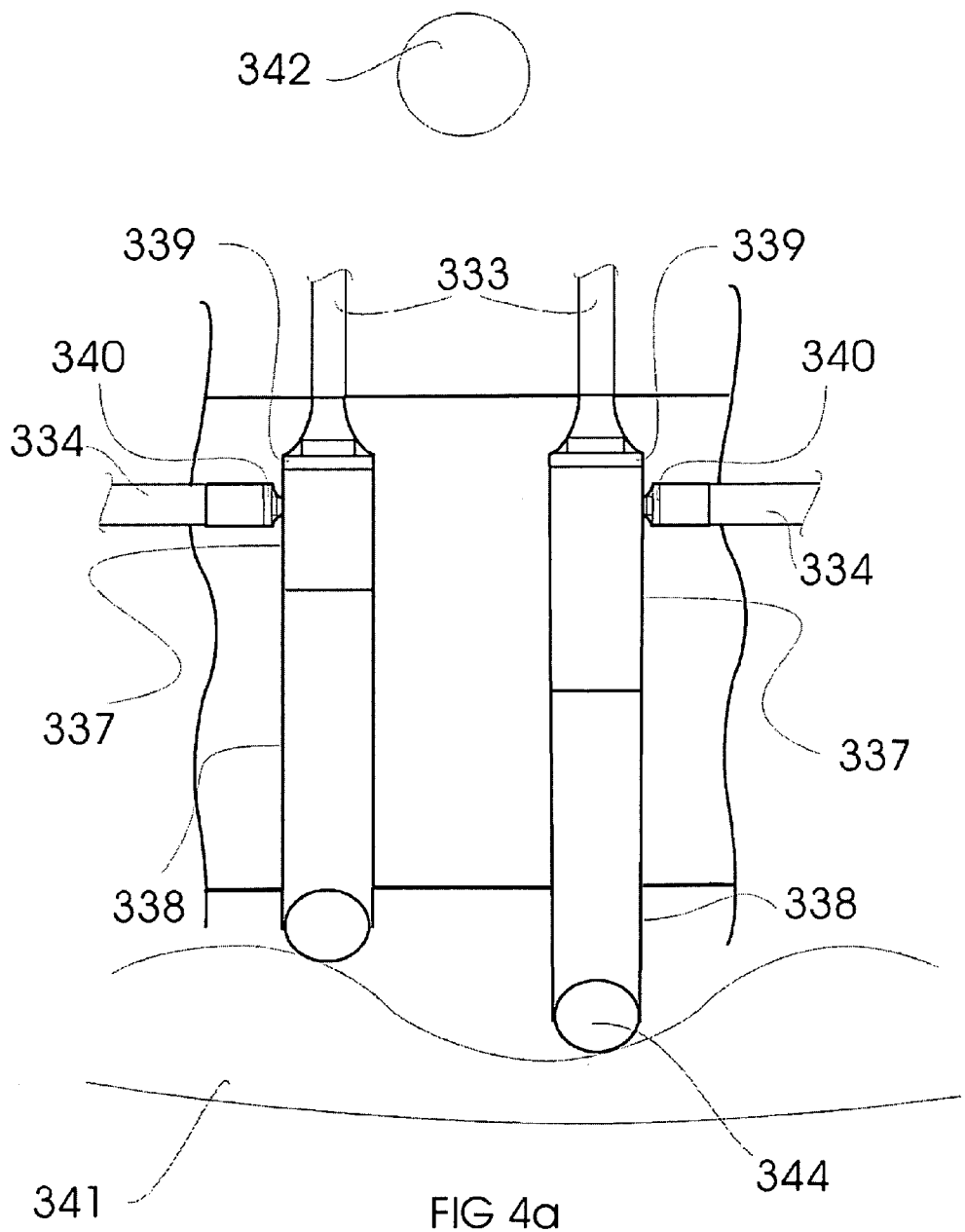
FIG. 4a shows a schematic view of a drive unit or an output unit according to embodiments described herein.

FIG. 4a shows a detailed schematic cross-sectional view of an embodiment of either the drive unit 331 or the output unit 332. Both can be designed similarly, but, in other embodiments, they are designed differently. In the drive unit 331 or the output unit 332, there are at least two cylinders located. These are the working chambers which are shown as cylinders 337 in the embodiment of FIG. 4a. In the following, the terms "cylinders" and "working chambers" are used synonymously. Pistons 338 can reciprocate within the cylinders 337. The cylinders 337 are linked to the storage (denoted with reference number 335 in FIG. 3b), for instance a low pressure manifold, via a hydraulic connection 333. Typically, an electromagnetically controllable valve 339 that can be a poppet valve or the like is able to separate the cylinders 337 and the storage 335. The valve 339 may be positioned between cylinder 337 and hydraulic connection 333. According to other embodiments, the valve may be placed in the hydraulic connection 333. According to yet another embodiment, the valve may be positioned at the outlet of the storage 335.

A connection of the cylinders 337 with another storage (denoted with reference number 336 in FIG. 4a), for instance a high pressure manifold, is further provided in the drive unit/output unit. This is arranged through a hydraulic connection 334 and a typically electromagnetically controllable valve 340 that can be a poppet valve or the like. As it is shown in FIG. 4a, this connection is located on the side of the drive unit/output unit. The valve 340 may be positioned between cylinder 337 and hydraulic connection 334. According to other embodiments, the valve may be placed in the hydraulic connection 334. According to yet another embodiment, the valve may be positioned at the outlet of the storage 336.

The valves 339 and 340 are controlled by a control unit (not shown). The control unit is able to give signals to open or close the valves depending on the actual situation.

Figure 4B:
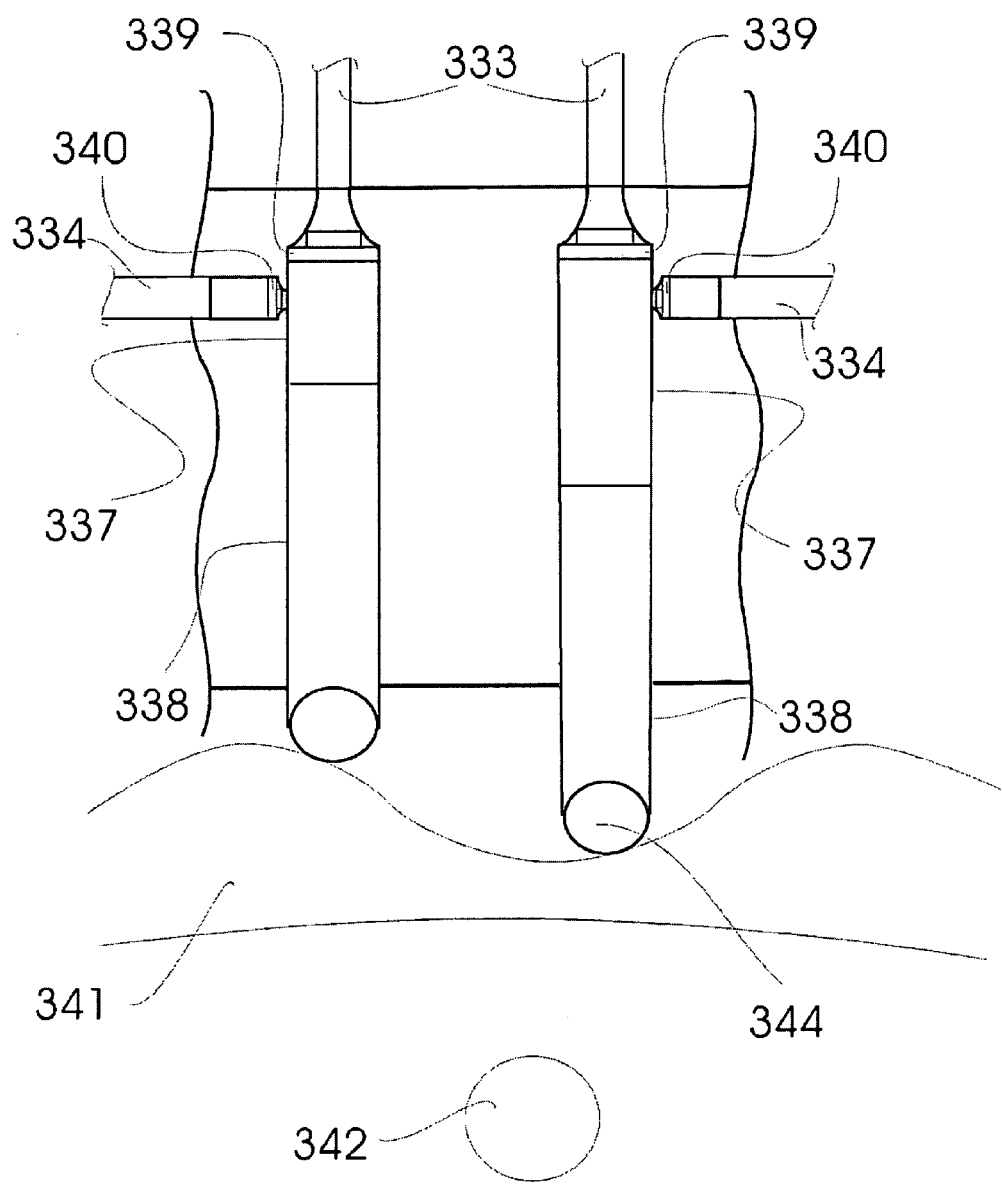
FIG. 4b shows a schematic view of a drive unit or an output unit according to another embodiment described herein.

The pistons 338 of the drive unit 331 or the output unit 332 are in contact to a cam 341. The cam may be a ring with one or more cams. Typically, the cams are continuous on the ring. The ring may have an overall bending that is concave (as shown in FIG. 4a) or convex (as shown in FIG. 4b) depending on the location of the cylinders. According to other embodiments, the cam may have another shape for instance a plate, a chain or the like. It is further possible that the cam is a cascade of ring segments. If the embodiment shown in FIG. 4a and 4b is used as a drive unit, the cam 341 moves dependent on the input movement. The input movement is given by the shaft 342 that transmits the energy from the drive shaft 310 to the drive unit. Shaft 342 can be the drive shaft 310 or the rotor shaft 240. When the cam rotates, the pistons 338 move according to the moving curved side of the cam. For instance, according to some embodiments described herein, the surface of the cam that is directed to the pistons may be sinusoidal. Accordingly, the pistons are moving upward, that is into the cylinder, when the roller 344 is on the top of a cam and moves downward, that is out of the cylinder, when the roller 344 is in the position between two cams.

By moving the pistons, the rotational kinetic energy is changed into hydraulic energy. For instance, when the cam 341 moves in such a way that the piston 337 moves upwards within the cylinder 337, the valve which controls the connection to the high pressure manifold is opened by the calculation unit. This valve is the valve 340 in the embodiment of FIG. 4a. Vice versa, i.e. when the cam moves in such a way that the piston moves downwards within the cylinder, the valve which controls the connection to the low pressure manifold is opened whereas the valve connecting the cylinder to the high pressure manifold remains closed. If the embodiment shown in FIG. 4a acts as an output unit, it operates vice versa.

According to embodiments described herein, the actuation of the pistons can be caused by other means than the cam. For instance, a cam plate may be used. According to another embodiment, a chain or the like may be used. According to yet another embodiment, a crank-connecting rod-piston system can be used.

The cam 341 is linked to the pistons 338 in order to transmit the energy given by the movement of the pistons 338. As the cam is connected to the shaft 342, the hydraulic energy is changed into energy of rotation in a certain transmission ratio. The transmission ratio is, inter alia, dependent on the design, in particular on the radius of the cam, and on the control actions taken by the control unit (not shown). According to some embodiments, the radius of the cam is designed in a way to achieve lowest contact stresses in the overrolling elements, in order to achieve longest possible component life. In the event that the embodiment shown in FIG. 4a is acting as output unit, the shaft 342 is connected to the outlet shaft 320. The shaft 342 can also be the outlet shaft 320 or the generator shaft 250. The outlet shaft 320 transmits the energy to the generator, e.g. via the generator shaft. The generator changes the kinetic rotational energy to electrical energy.

According to embodiments described herein, the drive unit as well as the output unit described above can be used as a motor as well as a pump. The actual function is determined by the control of the control unit.

A sequence of mode changes on successive machine cycles mixing pumping and motoring modes with idling modes allows the averaged effective flow rate into and out of the high pressure manifold 336 to be infinitely varied between full pumping flow, zero flow and full motoring flow. Mostly, the drive unit acts as a pump and the output unit act as a motor. In special cases, e.g. for starting the wind energy system, the function can be reversed.

According to embodiments described herein, five operating modes of the fluid-working machine for the wind energy system are possible: full stroke pumping, part stroke pumping, full stroke motoring, part stroke motoring, and idling. Thereby, the difference between part stroke and full stroke is the phase angle at which transitions are made from one of these states to the other relative to bottom and top dead center of the piston movement. This can be controlled by the control unit. The performing of the change from motor to pump mode and vice versa is typically not abrupt.

Figure 4C:
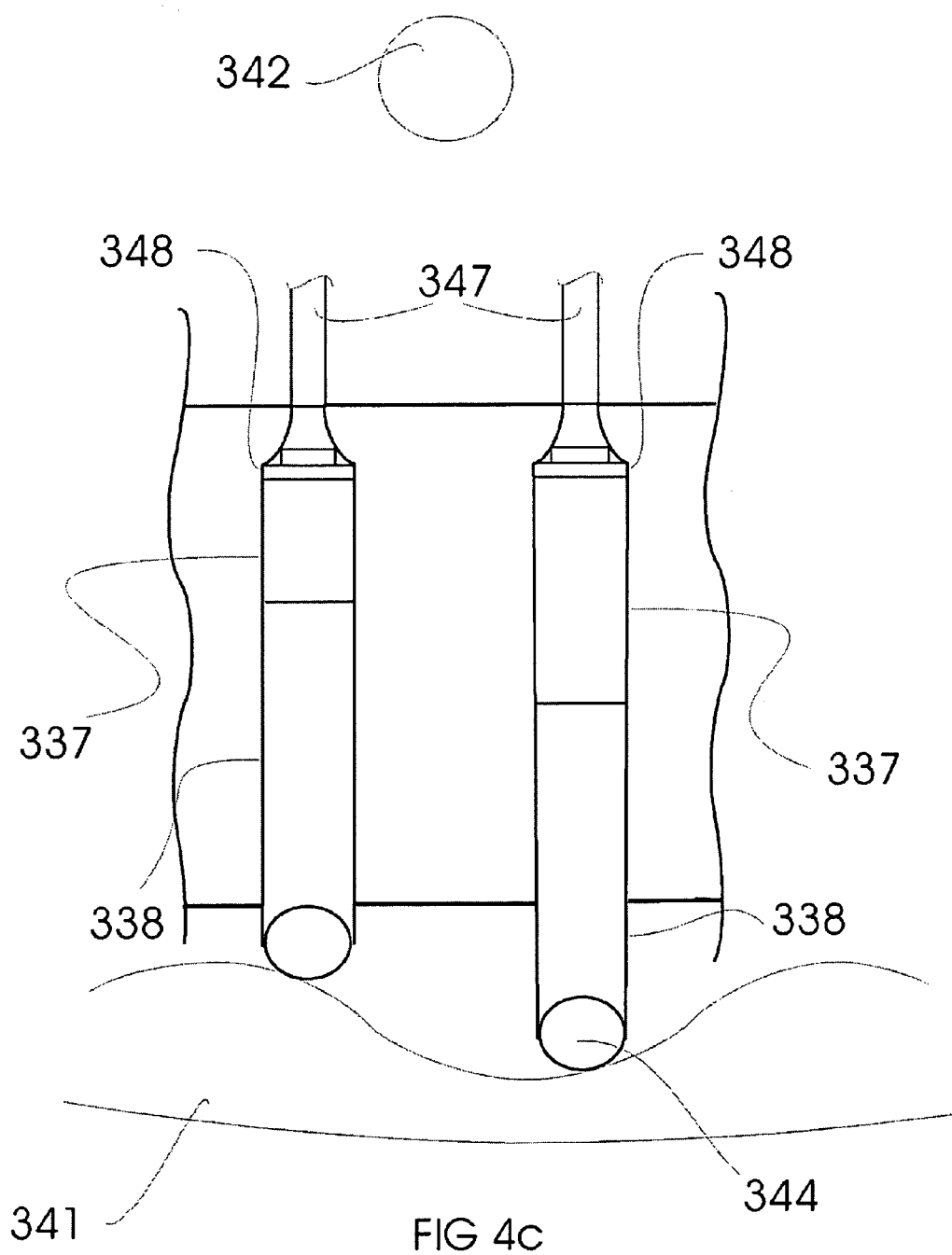
FIG. 4c shows a schematic view of a drive unit or an output unit according to further embodiments described herein.

According to further embodiments described herein, the working chambers 337 are connected to only one hydraulic connection, as shown in FIG. 4c, which corresponds to FIG. 3c. A valve 348 regulates the amount of fluid reaching the working chamber 337. The single hydraulic connection 347 is connected to both storages 335 and 336 that are, for instance, the low pressure manifold and the high pressure manifold. Additional valves may be located at the connection point of hydraulic connection 347 and storage 335 or 336 for regulating the flow of the respective content of the storages. According to embodiments described herein, a control unit is provided controlling the opening and closing of the additional valves at the connection point between hydraulic connection 347 and storages 335 or 336. The control unit is able to give signals to open or close the valves depending on the actual situation. Typically, the control unit is able to actuate the additional valves depending on the given input or the desired output of the transmission box. Thereby, the flow in hydraulic connection 347 is regulated.

Figure 4D:
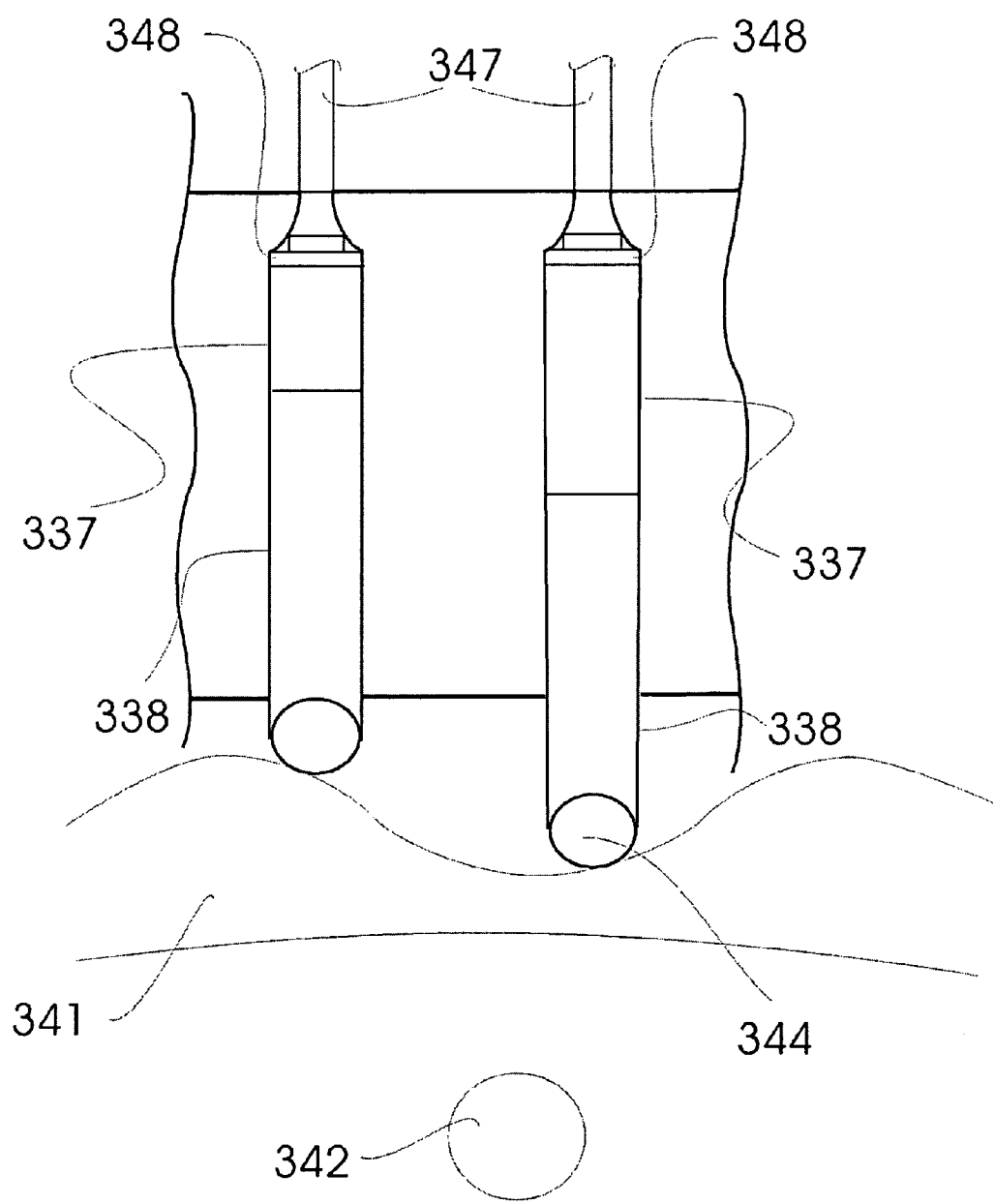
FIG. 4d shows a schematic view of a drive unit or an output unit according to further embodiments described herein.

In FIG. 4d, another embodiment is shown. In this embodiment, the drive unit 331 and the output unit 332 are connected by a single hydraulic connection 347. As in FIG. 4b, the ring 341 has a convex shape.

Figure 5A:
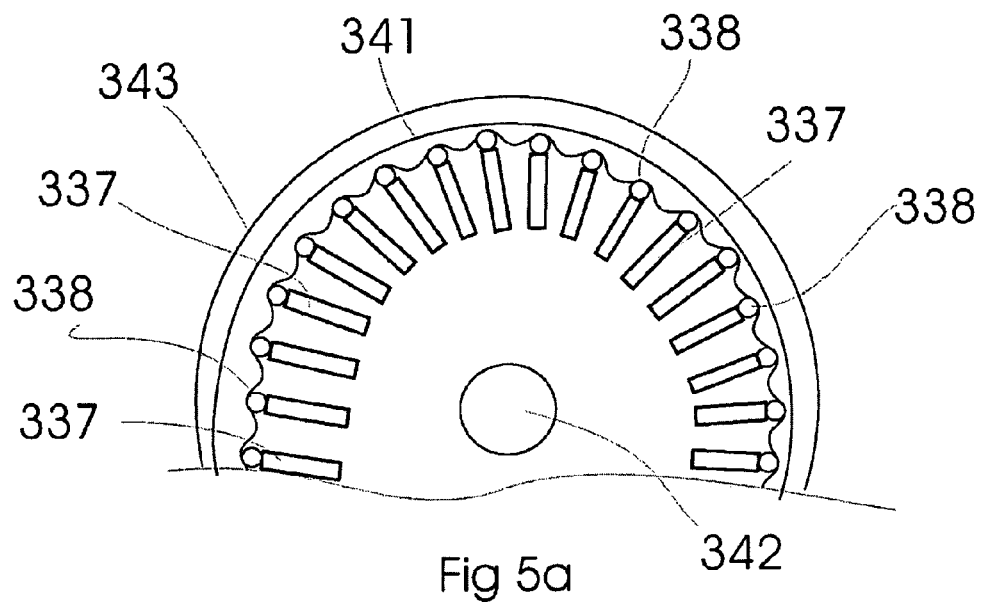
FIG. 5a shows a schematic plan view on the fluid working machine according to embodiments described herein.
Figure 5B:
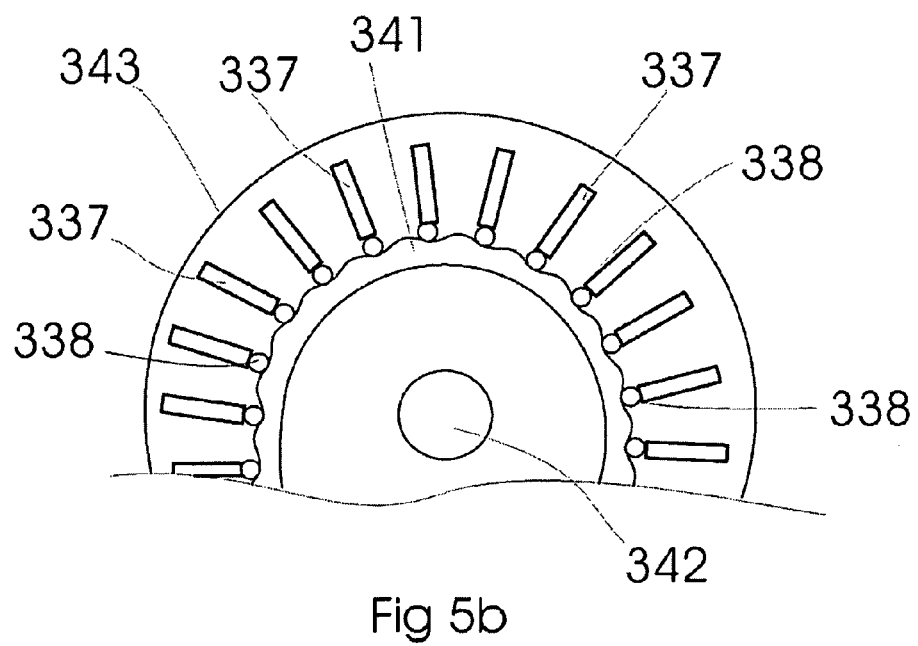
FIG. 5b shows a schematic plan view on the fluid working machine according to another embodiment described herein.

According to embodiments, the number of pistons is more than two. In case the number of pistons is more than two, the pistons can be arranged in the sort shown in FIG. 5a. FIG. 5a shows a top view of a fluid-working machine. The pistons 338 are arranged in a circular manner in the housing 343. The pistons are located around the shaft 342, which can be connected to the output or the drive shaft. According to some embodiments, the shaft 342 may be the drive shaft or the output shaft. The pistons 338 are driven by the cam 341. As for example shown in FIGS. 5a and 5b, the pistons are typically located radially in the housing. The cam in FIG. 5a has an overall bending in a concave manner. According to embodiments described herein, the cam can also be bent in a convex manner as shown in FIG. 5b. The overall bending of the cam is dependent on the location of the pistons in radial direction.

Figure 6:
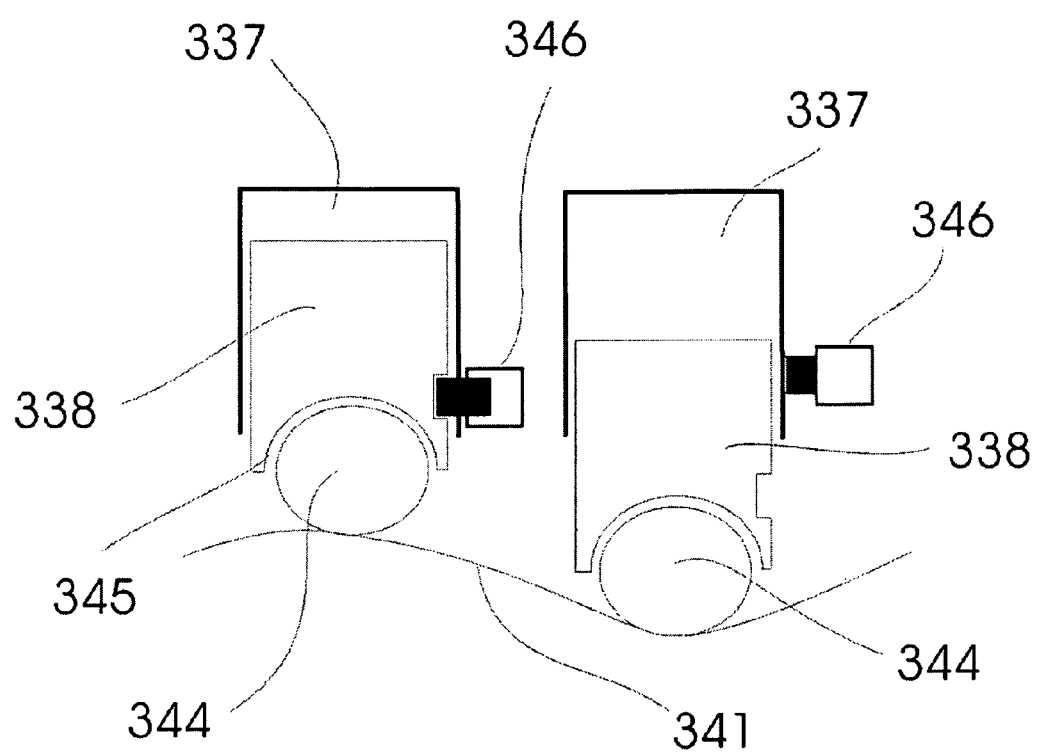
FIG. 6 shows another schematic view of a drive unit or an output unit according to embodiments described herein.

In FIG. 6, two working chambers are shown according to some embodiments described herein. The rollers 344 roll over the cam ring 341. The rollers are driven by the cam 341 that is moved by the shaft (not shown). The rollers 344 are in contact with the pistons 338. The connection between rollers 344 and pistons 338 is flexible and movable. For instance, the rollers can roll in a sort of guidance channel 345 in the pistons. Rollers as shown in the embodiment of FIG. 6 can be used in all embodiments described herein.

The positions of the cylinders in FIG. 6 show the on-cam position (left part of the figure) and the off-cam position (right part of the figure). These positions mark the default positions. If the piston is in the on-cam position, it is possible to block the piston by means 346 for keeping the piston in a blocked position according to embodiments described herein. Once the piston is in a blocked position, the working chamber is temporarily disabled. This may be, for instance, useful during the operation at low wind speeds. The means for keeping the piston in a blocked position are described below in more detail.

According to embodiments described herein, the fluid-working machine that acts as a transmission of a wind energy system is a hydraulic machine with non-symmetric actuation. The non-symmetric actuation is caused by cams. Further, means of temporarily disabling selected working chambers are provided. The selection of the working chambers is done by a calculation unit and depends on the actual wind situation and the desirable loads.

According to embodiments described herein, the fluid working machine which is part of and adapted for the operation of a wind energy system has a characteristic behavior regarding the transient pressure, volume flow, noise and efficiency. Typically, these characteristics are dependent on the mechanical design and electronic control. By using a non-symmetric actuation of the pistons the fluctuation of pressure and flow rate is decreased and the efficiency increased.

According to embodiments described herein, the control of the pistons is optimally adapted to the actual situation by a calculation unit. Thereby the characteristics of pressure, flow and noise can be controlled. Controlling allows a continual flow of the fluid in the fluid working machine thus a continual pressure characteristic and a continual and reliable energy output. As in wind energy systems the fluctuation is part of the problem, a controlling and diminution of the fluctuation is desirable. The tolerance of the wind energy system regarding the irregularities in flow increases. The energy output becomes safer and more calculable.

Hydraulic working machines are more efficient at high pressure levels. According to embodiments described herein, the reduction of the number of working chambers or the reduction of the volume of a working chamber is beneficial for lower torque operation in order to increase the pressure level in each working chamber and thus increase the overall efficiency of the transmission for low torque operation. This is due to the fact that hydraulic working machines are more efficient at high pressure levels. A machine designed for a specific torque experiences higher losses when operated at lower torque. Disabling the cylinders is typically controlled by the calculation unit. Typically, the wind energy system comprises a torque measurement device (not shown) for measuring the torque provided to the drive unit. For instance, the torque measurement device may allow a direct measurement of the torque exerted by the rotor, or it may calculate the torque from the generated power.

According to embodiments described herein, on control of the calculation unit, a part of the cylinders are operating in a stationary position or an idling position when they are disabled. If they are in a stationary position, they do not move at all. For instance, they are disconnected from the cam and rest in a position with the piston totally entered into the cylinder. The left figure in FIG. 6 shows this embodiment, when the piston is totally entered into the cylinder. If the pistons are in the idling position, the pistons are moved upwards and downwards along with the other pistons, but there is no force exchange as there is no alternate opening of the connections to the low pressure manifold and the high pressure manifold in the respective cylinders.

According to embodiments described herein, the reduction of the number of working chambers is arranged by working chamber disabling means 346. According to some embodiments, the working chamber disabling means comprise mechanical blocking devices for clamping the pistons in a fixed position, for example hooks or pins that are inserted when the piston is in TDC (top dead center). Such pins may have conical tips to lift rollers completely from the cam surface. Releasing of the pistons may happen in a timing-wise coordinate fashion to avoid rollers jamming the cam.

According to other embodiments, the working chamber disabling means comprise electromagnetic means for attracting the piston. For instance, the electromagnetic means include a coil that attracts a magnetic mass of the piston and/or a material attached to the cylinder. According to embodiments, which can be combined with other embodiments described herein, the control of the pistons may also be performed by the use of a Hall effect sensor.

According to still another embodiment, the working chamber disabling means make use of a pressure difference over the piston in the opposite direction than during pumping or motoring stroke. This may be done by artificially increasing the pressure at the low pressure side of the piston or by applying a low pressure at the pressure side of the piston. In some embodiments, the applied low pressure is even below atmospheric pressure. Springs may define the default position to be on-cam or off-cam as shown in FIG. 6.

Further, typically, means of controlling the actuation of the valves by electronic and/or electromagnetic means are provided such as a poppet valve made of electromagnets or the like. Typically, the pistons are fixed in the top dead center position when the cylinder is disabled.

A fluid-working machine with one or more working chambers is provided that is adapted for a wind energy system. This fluid-working machine comprises typically a drive unit and an output unit. Typically, the drive unit has at least two cylinders and/or the output unit has at least two cylinders. The drive unit can act as a pump and/or as a motor. In standard operation of the wind energy system, the drive unit typically operates as pump. The output unit can act as a pump and/or as a motor. In standard operation of the wind energy system, the output unit typically operates as a motor. The fluid-working machine is typically used as a transmission for the wind energy system. The fluid-working machine allows the transformation of a rotational movement to a rotational movement at a different rotational velocity due to the cooperation of the drive unit with the output unit. This fluid-working machine is used with the aim of optimizing the pressure, flow, efficiency, component load and thus life and noise characteristics by non-symmetric actuation.

Hydraulic working machines are typically more efficient at high pressure levels. Therefore, a machine which is designed for a specific torque or a specific pressure, experiences higher losses when operating at lower torque or lower pressure. For the operation mode during lower torque or lower pressure, it would be beneficial to reduce the number of active working chambers or the amount of activity of the working chambers in order to increase the pressure level in each active working chamber and thus increase the overall efficiency for low torque operation. The term "hydraulic working machine" in this context is used synonymously to the term "fluid working machine".

The temporary switching of at least one cylinder in the drive unit and/or the output unit to a predetermined state increases the efficiency of the fluid-working machine acting as transmission. For instance, the predetermined state may be a switches-off state or a reduced pressure state. This is particularly relevant in operational modes of the wind energy system that are considerably below the rated power, in particular in modes up to 60%, more typically up to 50% of the rated power. In those modes the operation of all pistons is not efficient. It is advantageous to switch at least one of the pistons in order to increase the pressure in the other pistons. The terms "switching off" and "disabling" are used synonymously herein. Switching of a part of the working chamber to a predetermined state is done in operation of the wind energy system. In particular, switching of a part of the working chambers is done while other working chambers are operating.

According to embodiments described herein, the non-symmetric actuation of the fluid-working machine is caused by mechanical means for blocking or clamping the pistons of the working chambers of the fluid-working machine, by a cam for driving the working chambers of the fluid-working machine in a given motion profile or by electronically controlling the valves.

By using the fluid-working machine with non-symmetric actuation an increase of the efficiency can be reached. Furthermore, the wind energy system, which the fluid-working machine is part of, performs better, that is, the wind energy system can cope with more irregularities in the energy flow. It might be that the physical efficiency decreases typically in the range of a percent by using a fluid-working machine as a transmission instead of a conventional gear. This percentage can be lowered by using the fluid-working machine according to embodiments described herein. Further, the economical efficiency can still increase in comparison to conventional gears. The enlargement of the economical efficiency is due to the decreasing costs for constructing and locating the fluid-working machine. Thus, it is possible to save costs in a remarkable range per Mega Watt during the lifetime of the wind energy system.

A continuously variable fluid-working machine for a wind energy system is provided that acts as a transmission. In wind energy systems, the fluctuation of the energy input and consequently the output also is very high due to the varying conditions dependent on the actual wind speed and wind direction. Thus, it is desirable that the fluctuation of the energy yield is decreased. As it is not possible to influence the wind conditions, a continuously variable machine acting as a transmission as described herein can help to minimize the effects of the fluctuations on the energy output.

According to embodiments described herein, a fluid-working machine with non-symmetric actuation of the pistons is used as a continuously variable transmission. The non-symmetric actuation can be caused e.g. by a valve train control that controls the actuation of the valve and is therefore able to block certain working chambers of the fluid working machine. Typically the non-symmetric actuation can also be caused by mechanical means e.g. a non-circular cam that moves the pistons and/or is moved by the pistons.

According to embodiments described herein, the drive unit as well as the output unit, as described above, can act as a motor and/or as a pump. The function of the unit can be changed by changing the direction of actuation. Therefore, the embodiments described herein, apply to the working chambers acting as a pump as well as for the working chambers acting as a motor and vice versa.

According to embodiments described herein, the number of cylinders and pistons of the fluid-working machine for the wind energy system may be more than 15, typically more than 40 and even more typically more than 60 or even 100. In typical embodiments, between 60 and 120 cylinders and pistons are provided in each the drive unit and the output unit. Typically, the cylinders are arranged on a circular arrangement. Typically, the control unit switches 1/n of all cylinders to a predetermined state. For instance, if there are 80 cylinders in total, ¼ of all the cylinders could be switched off during low torque operation (i.e. n=4). According to typical embodiments described herein, in the event that 1/n of all cylinders are switched to a predetermined state, every nth of the cylinders is switched. In other word, the cylinders chosen to be switched are homogeneously distributed over all cylinders. This guarantees a homogeneous force transmission and reduces the load on the transmission due to irregular force distribution within the cylinder unit. According to typical embodiments, n is larger than 1 and chosen such that the total number of working chambers divided by n is an integer. Further, the smaller the torque, e.g. due to low wind conditions, the higher n is chosen. With very low wind conditions, it is also possible to disable e.g. ⅔ or ¾ of all the working chambers.

According to embodiments described herein, the application of a fluid-working machine acting as a transmission reduces costs for the setup of the fluid-working machine in the wind energy system due to the lower weight of the fluid-working machine and due to the lower construction costs compared to a conventional mechanical gear.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind energy system comprising a fluid-working machine with non-symmetric actuation acting as a transmission, the fluid-working machine comprising working chambers that are switchable to a predetermined state by a pressure difference opposite to the pressure difference during operation of the working chambers.

2. The wind energy system according to claim 1, wherein the working chambers comprise valves that control a fluid traversing the working chambers.

3. The wind energy system according to claim 1, wherein the fluid-working machine further comprises a drive unit for receiving rotational movement and an output unit for delivering rotational movement.

4. The wind energy system according to claim 3, wherein each of the drive unit and the output unit comprises at least 15 working chambers.

5. The wind energy system according to claim 1, further comprising a control unit to control a parameter comprising controlling the non-symmetric actuation and switching off working chambers.

6. The wind energy system according to claim 1, further comprising working chamber disabling means for temporarily switching the working chambers to the predetermined state.

7. The wind energy system according to claim 6, wherein the working chamber disabling means comprises mechanical blocking means for temporarily disabling selected working chambers.

8. The wind energy system according to claim 6, wherein the working chamber disabling means comprises electromagnetic means for temporarily disabling selected working chambers.

9. The wind energy system according to claim 1, wherein the fluid-working machine further comprises a cam for moving pistons of the fluid-working machine.

10. A wind energy system comprising a fluid-working machine with non-symmetric actuation acting as a transmission, the fluid-working machine comprising working chambers that are switchable to a predetermined state by a pressure difference opposite to the pressure difference during operation of the working chambers, whereby said fluid-working machine receives a rotational force and outputs the rotational force to a second device.

11. A method for operating a wind energy system comprising a fluid-working machine with non-symmetric actuation acting as transmission of the wind energy system, the method comprising:

switching working chambers of the fluid-working machine to a predetermined state by a pressure difference opposite to the pressure difference during operation of the working chambers.

12. The method according to claim 11, wherein the fluid-working machine comprises a drive unit for receiving rotational movement, the drive unit having at least two working chambers, the method further comprising:

switching off at least one of the working chambers.

13. The method according to claim 12, further comprising:

measuring a torque provided to the fluid-working machine, wherein switching off the at least one of the working chambers is dependent on the measured torque.

* * * * *